United States Patent
Barskey et al.

[11] Patent Number: 5,765,780
[45] Date of Patent: Jun. 16, 1998

[54] SYSTEMATIC VECTORED THRUST CALIBRATION METHOD FOR SATELLITE MOMENTUM CONTROL

[75] Inventors: Michael F. Barskey, Hermosa Beach; John F. Yocum, Jr., Rancho Palos Verdes, both of Calif.

[73] Assignee: Hughes Electronics Corporation, El Segundo, Calif.

[21] Appl. No.: 577,595

[22] Filed: Dec. 22, 1995

[51] Int. Cl.$^6$ ........................ B64G 1/28
[52] U.S. Cl. ............... 244/165; 244/168; 244/169; 244/164
[58] Field of Search ............... 244/165, 164, 244/169, 168; 364/463, 567

[56] References Cited

U.S. PATENT DOCUMENTS

| | | |
|---|---|---|
| 2,963,243 | 12/1960 | Rothe ........................... 244/165 |
| 3,741,500 | 6/1973 | Liden . |
| 4,230,294 | 10/1980 | Pistiner ........................ 244/165 |
| 5,133,518 | 7/1992 | Flament ........................ 244/168 |
| 5,337,981 | 8/1994 | Bender ........................ 244/164 |
| 5,349,532 | 9/1994 | Tilley et al. ................. 244/164 |
| 5,443,231 | 8/1995 | Anzel ........................... 244/164 |
| 5,571,953 | 11/1996 | Wu ............................... 364/463 |

Primary Examiner—Andres Kashnikow
Assistant Examiner—Tien Dinh
Attorney, Agent, or Firm—Terje Gudmestad; Elizabeth E. Leitereg; Michael W. Sales

[57] ABSTRACT

A method of simultaneously performing a translational maneuver of a spacecraft by a thruster and dumping momentum from the spacecraft during a time period P. The method entails aligning the thruster along a thrust vector which is fixed during the time period P, wherein the thrust vector is aligned with the center of mass of the spacecraft at a time P/2, and firing the thruster throughout the time period P.

14 Claims, 8 Drawing Sheets

CM MOTION AT TIME OF BURN APPEARS AS SEASONAL VARIATION + RAMP

CM MOTION DUE TO WING IS DIURNAL

CM MOTION DUE TO FUEL DEPLETION

FIG. 15A ROLL TORQUE

FIG. 15B PITCH TORQUE

FIG. 15C YAW TORQUE

FIG. 16 $\tau_w(t)$

5,765,780

SYSTEMATIC VECTORED THRUST CALIBRATION METHOD FOR SATELLITE MOMENTUM CONTROL

BACKGROUND OF THE INVENTION

When a spacecraft, such as a satellite, moves through outer space, it encounters a variety of internal and external events or disturbances which create torques on the spacecraft. For example, spacecraft will encounter torquing as a result of the solar radiation striking the spacecraft. This type of torquing is, of course, more prevalent on spacecraft which use solar panels to generate power. Other disturbances which may cause unwanted torquing are magnetic disturbances. The end result of all of these factors is that the spacecraft encounters torques which can cause the spacecraft's position to be misaligned. Of course, should the force corresponding to a disturbance be directed through the center of mass of the spacecraft, no torque from that disturbance will be generated. However, torques will be exerted on the spacecraft when the forces from the disturbances are not directed through the center of mass. These torques hinder controlling the orbit of geostationary satellites orbiting the earth. Controlling the orbit so that the satellite is constantly above a fixed point on the earth is often called stationkeeping.

Figure 4:
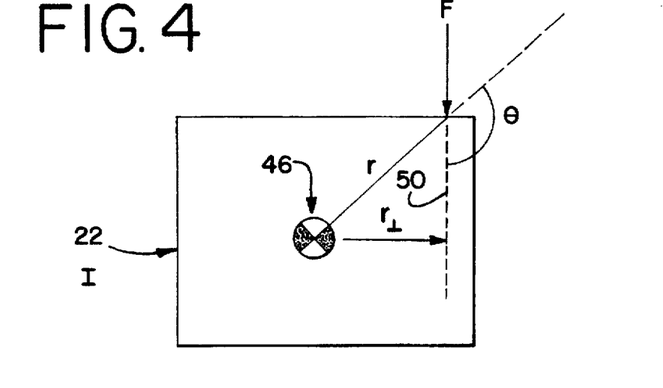
FIG. 4 shows a force exerted on the spacecraft of FIG. 1.
Figure 5A:
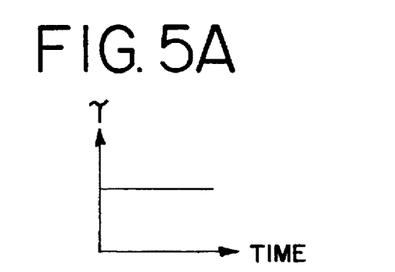
FIGS. 5A–B show the relationship of the torques and angular momentum exerted on a spacecraft over time due to the force of FIG. 4.
Figure 5B:
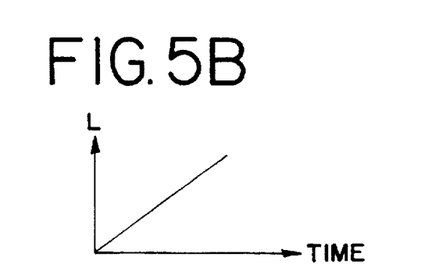

In the case where the torque exerted on the spacecraft is constant, then it follows that the magnitude of the torque, $\tau$, is expressed as:

$$\tau = rF \sin \theta = r_\perp F = I\alpha = I \, d\omega/dt = dL/dt,$$

where F is the force exerted on the spacecraft and r, $r_\perp$ and $\theta$ are shown in FIG. 4;

I=moment of inertia;
$\alpha$=angular acceleration;
$\omega$=angular velocity; and
L=angular momentum. As shown in FIGS. 5A and B, when the torque, $\tau$, is constant, the angular momentum, L, and the angular velocity, $\omega$, linearly increase with time. However, it is not desired to have the satellite to spin at all because the side of the satellite opposite the thrusters needs to be constantly pointed at a single point located on the earth. Currently, most satellites have an on-board attitude control system which senses when the satellite begins to rotate in response to a disturbance torque. The rotation indicates that the satellite has absorbed some angular momentum from the disturbance. The satellite counteracts the rotation by having a momentum accumulator, such as a momentum wheel, store the unwanted momentum.

In order to prevent the satellite from rotating, the sum of the torques generated by the disturbances and the momentum wheel should equal zero. Expressed another way, $$\tau_{TOTAL} = \tau_{WHEEL} + \tau_{DISTURBANCE} = 0;$$

$$I_{WHEEL} d\omega_{WHEEL}/dt = rF \sin \theta.$$

As long as the disturbance force vector, F, is constant, $\omega_{WHEEL}$ will increase linearly with time according to the expression, $$\omega_{WHEEL} = rFt \sin \theta / I_{WHEEL}.$$

The momentum stored by the wheel is dumped from time to time while the satellite is travelling along its orbit.

In order to control the attitude of the spacecraft during momentum dumping in particular and stationkeeping in general, prior attitude control systems sense the attitude errors using a sensor on board or on the earth and then torquing the momentum wheel(s) to reduce the attitude error. For example, when the spacecraft is in position to dump momentum, the thrusters are fired and the momentum wheels are simultaneously unwound in a direction opposite to the direction in which they accumulated the momentum. Another example of momentum dumping is to move the thrusters during a translational maneuver so that the momentum wheels are unwound during firing of the moving thrusters. Momentum can be dumped from the momentum wheels during the operation of a heat tacking maneuver by the solar panels or during the operation of a magnetic torquer.

Another attitude control system is described in "Spacecraft Mass Property Identification with Torque Generating Control," Journal of Guidance and Control, Vol. 13, No. 1, Jan.–Feb. 1990 by E. Bergmann and J. Dzielski. The disclosed system requires accelerometers or on-board calibration software.

While the above-mentioned techniques have been acceptable, there is still room for improvement. For example, some prior techniques require additional sensors and electronics not required for attitude control alone or extensive modifications to existing attitude control systems. These techniques are unable to account for external disturbances encountered by the spacecraft, such as solar torques.

SUMMARY OF THE INVENTION

The present invention provides a quasi-closed loop control system for controlling the momentum of a spacecraft that encounters time-varying external disturbances during a translational maneuver while using a thruster. The attitude control system of the present invention is capable of improved alignment of the vectored thrusters so that they point toward the center of mass of the spacecraft.

In particular, the present invention may be embodied in a momentum control system for a spacecraft having a propulsion system in which a disturbance is exerted on the spacecraft. The momentum control system has a control processor for receiving an attitude signal representative of the attitude motion of the spacecraft. The control processor processes the attitude signal to generate a state variable signal representative of one or more state variables of the spacecraft. A system identification processor then receives the state variable signal and isolates a signal which has the characteristics of the disturbance exerted on the spacecraft. The system identification processor further generates a pseudo input signal for the isolated disturbance which within a multiplicative constant has the same characteristic or shape as the actual disturbance would have if it had been measured. The system identification processor processes the pseudo input signal to generate a thruster torque signal representative of a thruster torque generated by the propulsion system. A propulsion processor receives the thruster torque signal and generates a control command signal representative of a maneuver to be performed by the propulsion system, wherein the control command signal is sent to the control processor which aligns the propulsion system in response to the control command signal.

Another aspect of the present invention is a method of controlling momentum of a spacecraft having a propulsion system in which a disturbance is exerted on the spacecraft. The method entails receiving an attitude signal representative of the attitude motion of the spacecraft and generating from the attitude signal a state variable signal representative of several state variables of the spacecraft. A disturbance signal is isolated from the state variable signal which has the characteristics of the disturbance exerted on the spacecraft.

A pseudo input signal is generated from the isolated disturbance signal which within a multiplicative constant has the same characteristic or shape as the actual disturbance. The propulsion system is then aligned in response to the pseudo input signal.

Another aspect of the present invention is a method of simultaneously performing a translational maneuver of a spacecraft by a thruster and dumping momentum from the spacecraft during a time period P. The method entails aligning the thruster along a thrust vector which is fixed during the time period P, wherein the thrust vector is aligned with the center of mass of the spacecraft at a time P/2 and firing the thruster throughout the time period P.

The above-described momentum control system and momentum control methods of the present invention prevent momentum buildup and minimize attitude errors without changing existing attitude control software. The present invention is able to sense real-time conditions on the spacecraft and, thus, generate more accurate attitude control of the spacecraft. The disclosed system more accurately reorients the thrusters by more accurately determining the center of mass of the spacecraft. The disclosed system provides a further method of operating a spacecraft more efficiently while using data already available in prior attitude control systems without the implementation of additional hardware or calibration software.

The foregoing features and advantages of the present invention will be further understood upon consideration of the following detailed description of the invention taken in conjunction with the accompanying drawings, in which:

DESCRIPTION OF THE PREFERRED EMBODIMENT

A spacecraft or satellite 20 employing a momentum control system according to the present invention is shown in FIGS. 1–16 where like elements are denoted by like numerals. The spacecraft 20 has a spacecraft body 22 which includes a lower bus module 24 and an upper payload module 26. Attached to the aft end of the lower bus module 24 are a plurality of engines which will be discussed in detail later. The lower bus module 24 contains fuel tanks (not shown) and various power and control modules which operate the engines and power the payload module 26. The bus module 24 further includes a pair of solar panels 28 which convert sunlight into electricity which is sent to batteries (not shown) located on the bus module 24. The bus module 24 also has one or more antennae 30 and reflectors 32, which receive signals from a ground station on earth which are used to control the spacecraft 20. The payload module 26 may include one or more heat radiators 34 to emit heat generated on the spacecraft 20.

Figure 1:
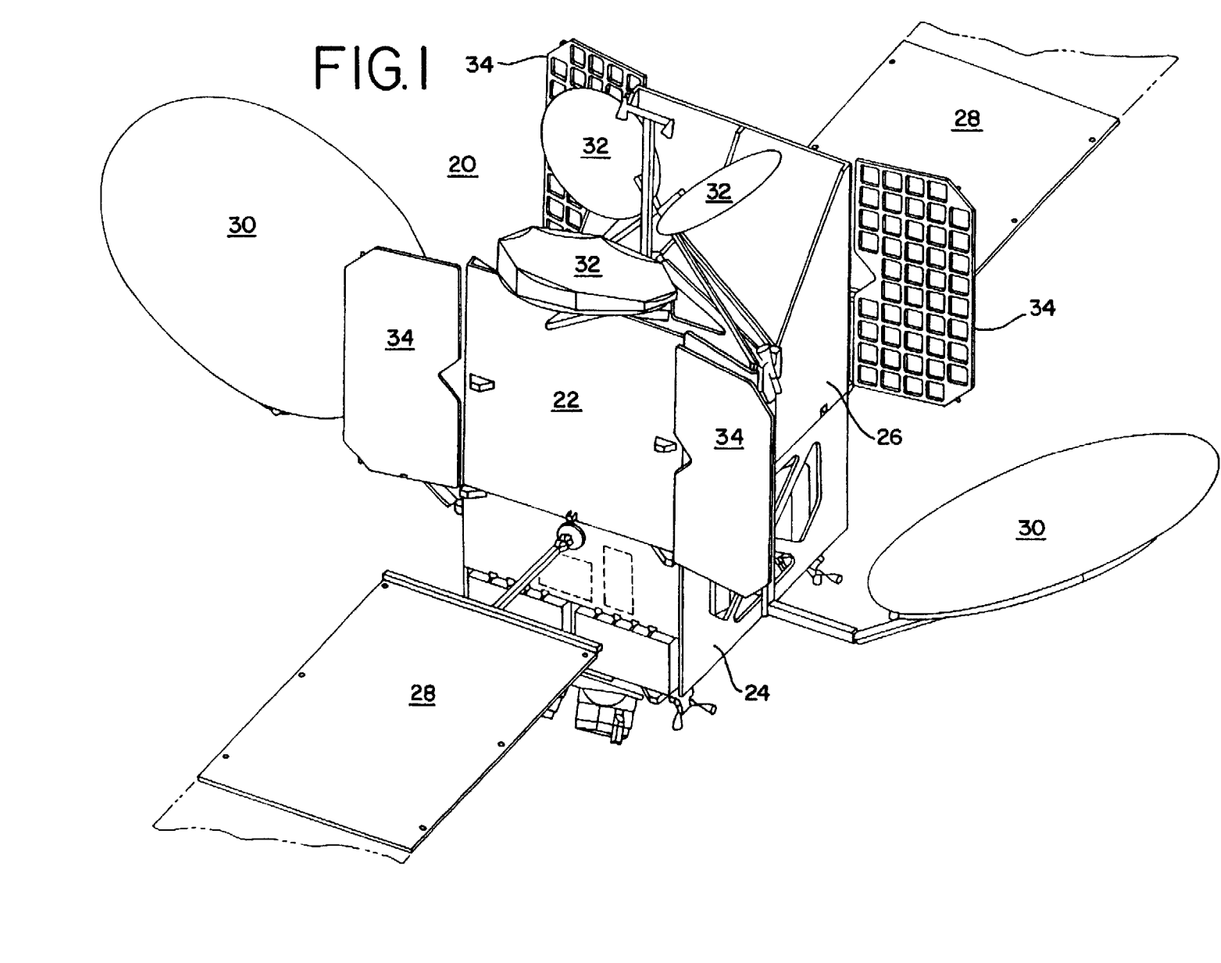
FIG. 1 shows a spacecraft capable of employing the attitude control system and method of the present invention.
Figure 2:
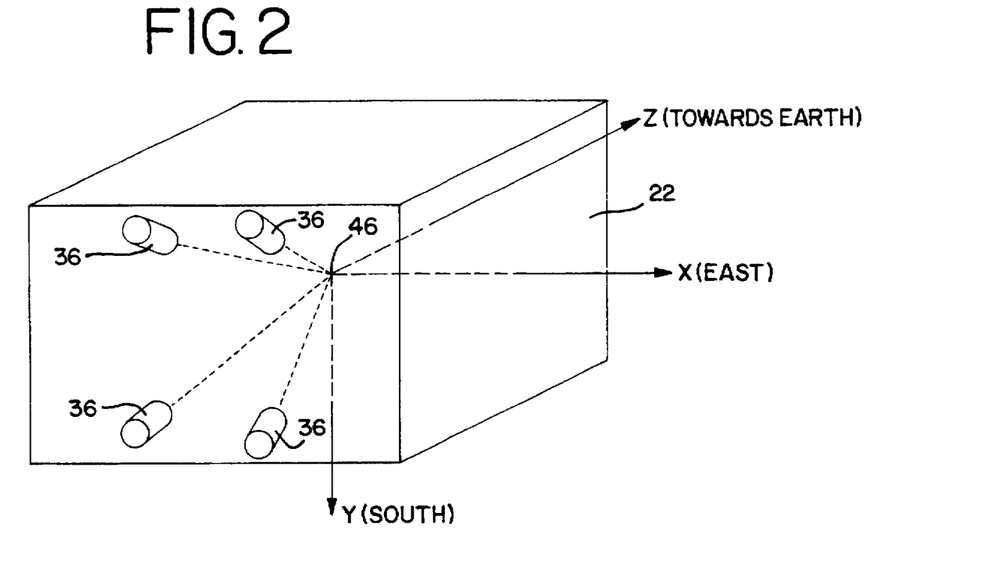
FIG. 2 shows a thruster array to be used with the spacecraft of FIG. 1.
Figure 3:
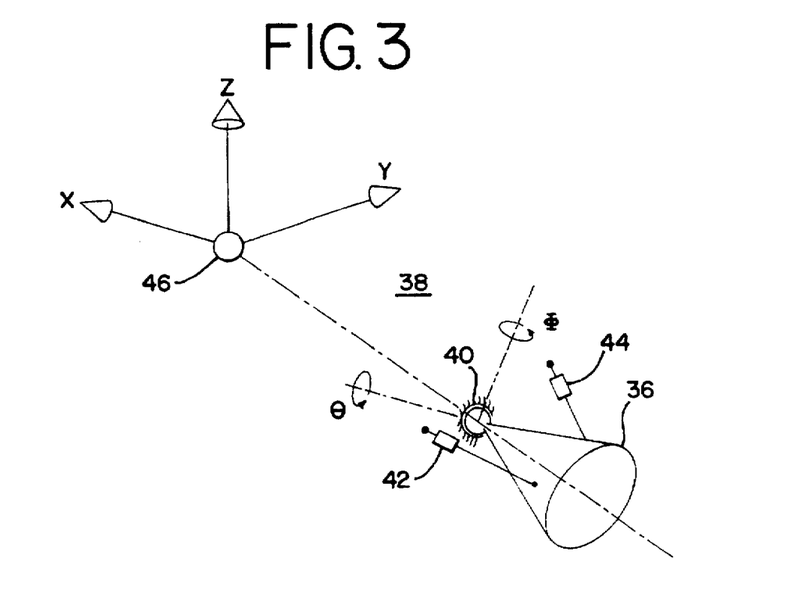
FIG. 3 shows a gimbaled thruster to be used in the thruster array of FIG. 2.

The spacecraft 20 contains a variety of electronic equipment which may contain a number of sensors (not shown). The electronic equipment processes information gathered by the sensors and sends the processed information back to the ground station via antennae 30 and reflectors 32. As shown in FIGS. 1–3, the spacecraft or satellite 20 has a propulsion system having one or more thrusters 36 attached thereto via a thruster platform 38 having a gimbal mechanism 40 and actuators 42 and 44. As shown in FIG. 3, actuators 42 and 44 are operationally attached to each gimbaled thruster 36 so as to control the angled position of the gimbaled thruster 36 in two orthogonal directions. One actuator 42 changes length to rotate at least one thruster 36 through gimbal angle Φ and another actuator 44 changes length to rotate at least one thruster 36 through gimbal angle θ. Each thruster 36 preferably is an electronic thruster, such as a xenon ion propulsion thruster.

Figure 6:
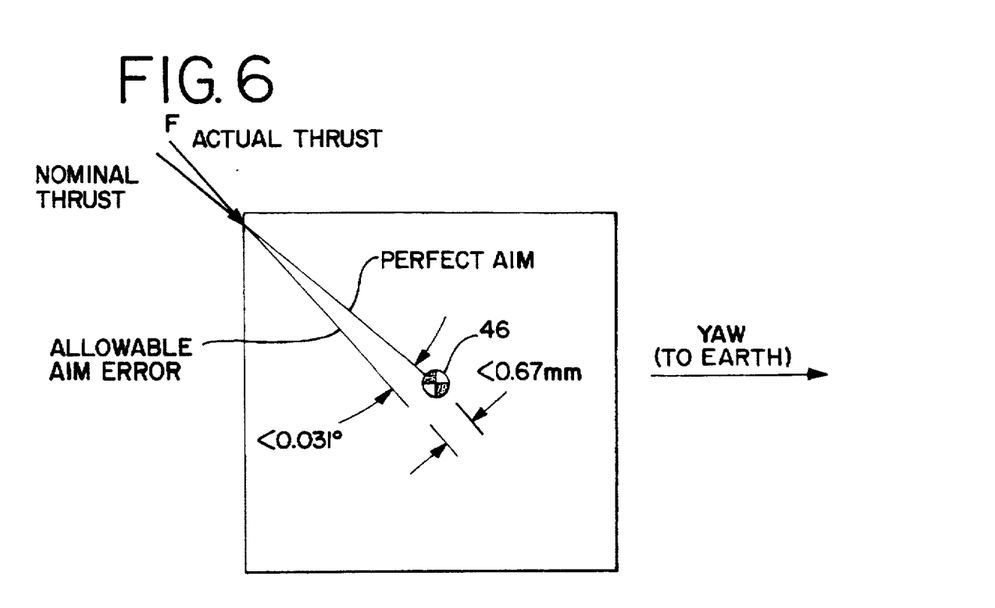
FIG. 6 shows the allowable aim error for a thruster of the spacecraft of FIG. 1.

In the past, stationkeeping maneuvers were performed by fixed thrusters which could cause large errors in the pointing of the spacecraft. Such errors would require frequent momentum dumps to be performed separate from the stationkeeping maneuver during a day of orbiting the earth. The use of gimbaled thrusters 36, however, improves their alignment with the center of mass and cuts the number of momentum dumps down to two per day where each dump lasts between two to four hours. As shown in FIG. 6, given that torques less than 12 µNm are acceptable, the thrusters 36 must be angled within 0.031° of perfect alignment and the actual thrust line must be less than 0.67 mm from the center of mass 46. However, due to uncertainties in thruster alignment, thruster performance and satellite mass properties, it is impossible to predict the location of the center of mass within the spacecraft for more than a few weeks.

Figure 7:
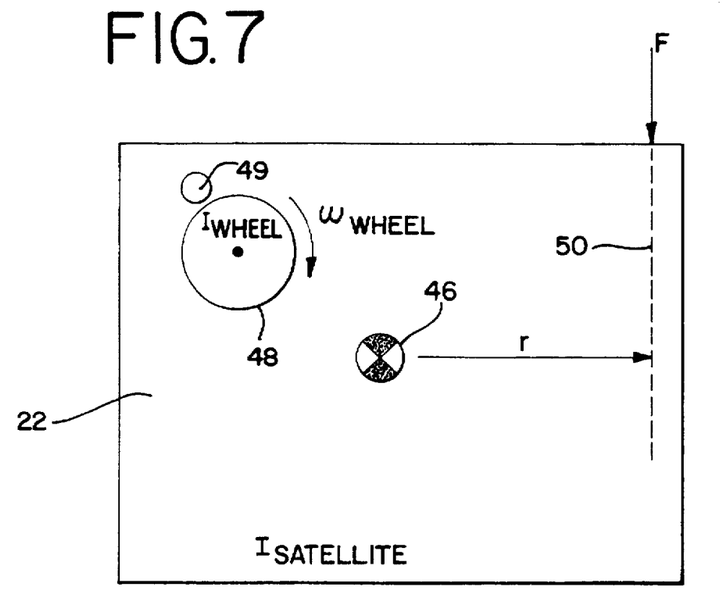
FIG. 7 schematically shows a momentum accumulator for the spacecraft of FIG. 1.
Figure 8:
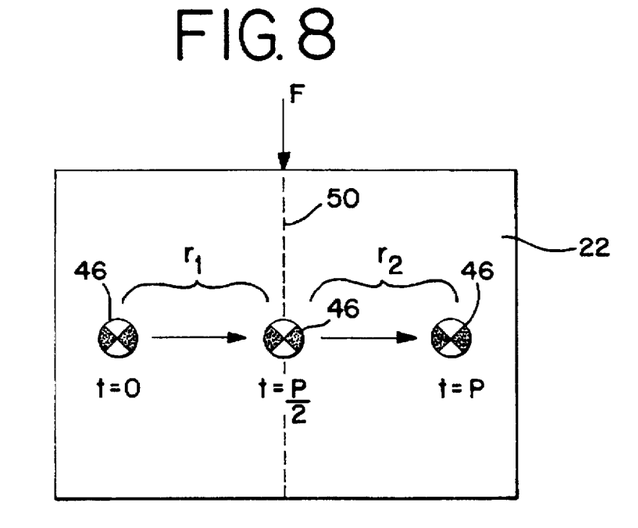
FIG. 8 shows a momentum dumping maneuver of the present invention.

Furthermore, the fact that the location of the center of mass changes with time necessitates the adoption of a new type of momentum dumping maneuver, as shown in FIGS. 7–8. In the past, translational maneuvers and momentum dumping were performed at different instances of time. The new maneuver constitutes calculating a thrust vector, F, which allows for all the momentum to be dumped from a momentum accumulator, such as momentum wheel 48, simultaneously during a translational maneuver of duration P. The thruster 36 is then aligned, via gimbal mechanism 40, and fixed and fired along the calculated thrust vector F for a time period P. As shown in FIGS. 7–8, thrust vector F is initially fired at t=0 so that the center of mass 46 is at a distance $r_1$ to the left of the thrust line 50 which is aligned with F. Since F imparts positive momentum onto the spacecraft 20, the momentum wheel must be spun in a way that it will accumulate negative momentum to offset the positive momentum. As time passes, the center of mass 46 moves and therefore the amount of positive momentum encountered lessens. Accordingly, the amount of negative momentum stored at each instant of time lessens until it becomes zero at t=P/2. At the midpoint of period P, the center of mass 46 is intersected by thrust line 50 (i.e. thrust vector V is aligned with the center of mass 46) and, thus, no torque and angular momentum is generated. After t=P/2, the center of mass 46 moves to the right of the thrust line 50 which means that the spacecraft 20 encounters negative torques and momentum. The momentum wheel 48 then spins in the opposite direction to dump or release the momentum previously stored on the wheel in amounts to counteract the negative momentum encountered. After the end of period P, the thruster 36 is turned off until the next maneuver. Should the center of mass 46 travel in the second phase of the maneuver a distance $r_2$ which is equal to $r_1$, then the momentum accumulated up to t=P/2 will equal the amount of momentum dumped from t=P/2 to the end of time period P. Thus, the momentum wheel 48 will not have accumulated or lost any net momentum for the entire maneuver. By initially pointing the thruster vector F so that thrust line 50 intersects the center of mass 46 midway through the maneuver (t=P/2), the accumulation of momentum and attitude of the spacecraft 20 are controlled.

Figures 9, 10, 11:
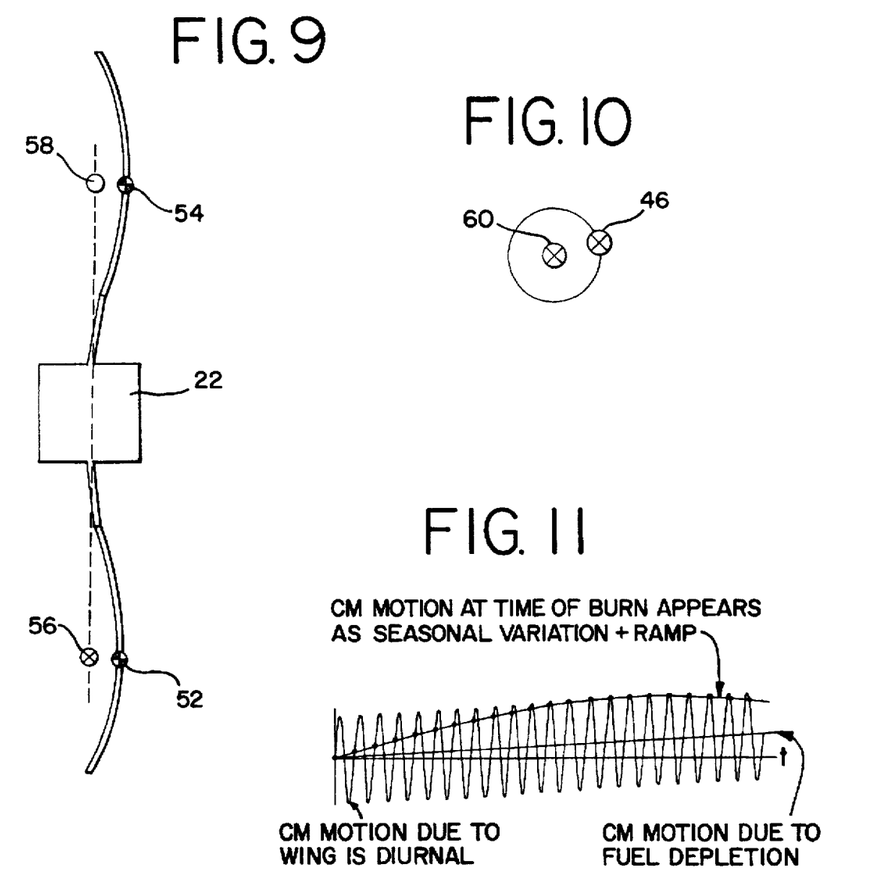
FIG. 9 shows a warped solar panel of the spacecraft of FIG. 1.
FIG. 10 shows the circular movement of the center of mass of the spacecraft of FIG. 1.
FIG. 11 shows the center of motion of the spacecraft of FIG. 1 due to the rotation of the solar panels and/or depletion of fuel.
Figure 12:
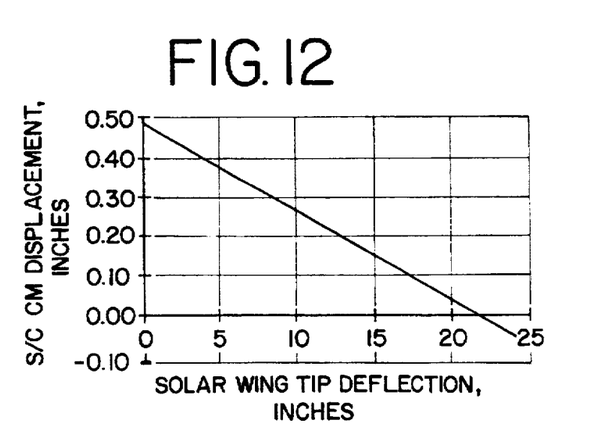
FIG. 12 shows the relationship between rotation of a solar panel and the location of the center of mass of the spacecraft of FIG. 1.
Figure 13:
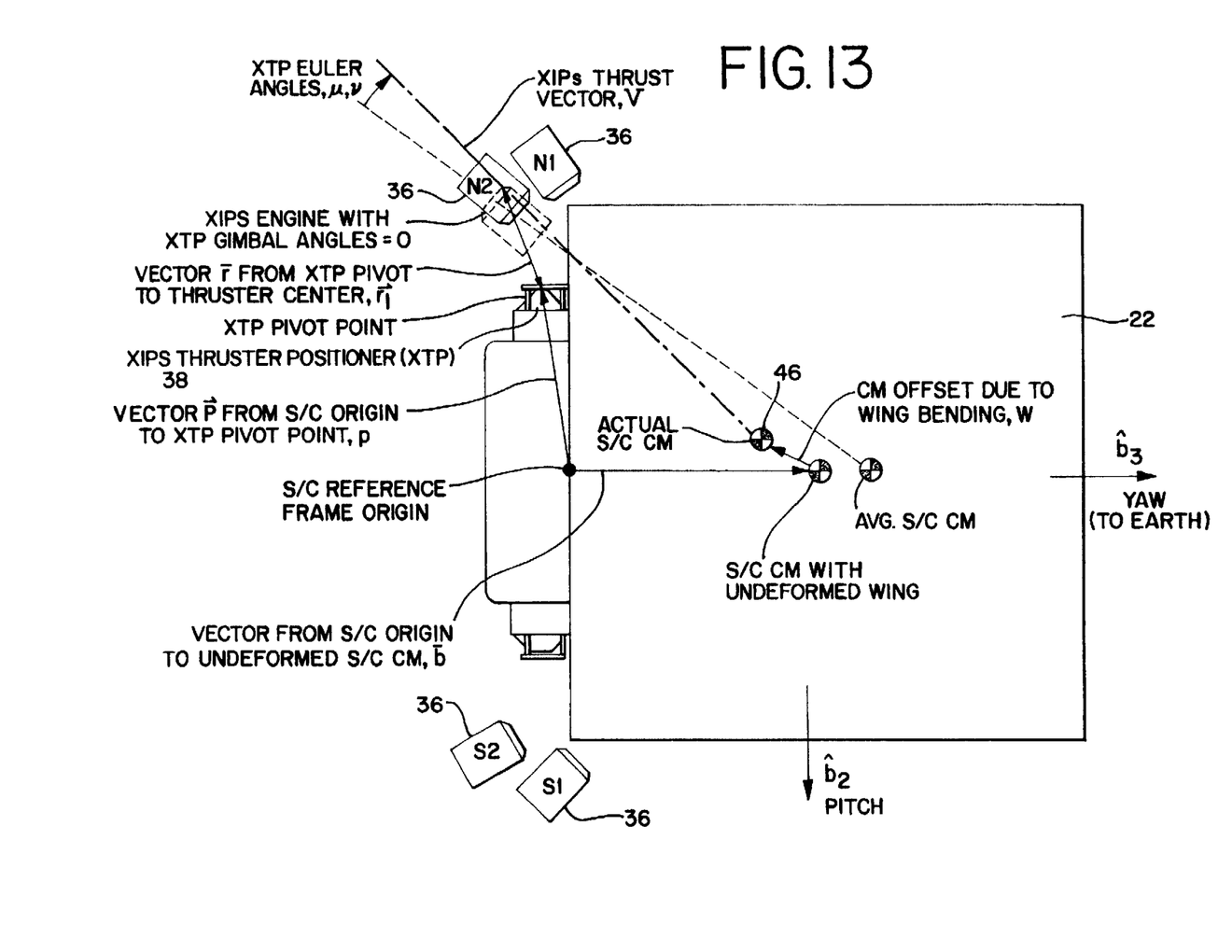
FIG. 13 shows the geometric relationship between the center of mass and the thrusters of the spacecraft of FIG. 1.

As described above, there cannot be much error in determining the location of the center of mass in order to optimally align thrusters 36 for a maneuver through the center of mass at t=P/2. As shown in FIGS. 9–13, there are several contributing factors to this uncertainty. First, as shown in FIG. 9, the solar panels 28 will become warped since only one side of a solar panel 28 faces the sun at any given time. This warping causes the center of masses 52, 54 of the south and north solar panels 28 to be offset from the corresponding center of masses 56, 58 of the dewarped solar panels 28 (dashed lines), as shown in FIG. 9. The end result of the warping of the solar panels 28 is that the actual center of mass 46 of the spacecraft 20 rotates in a circular path of radius w about an ideal center of mass 60 which represents the center of mass of the spacecraft 20 when the solar panels are dewarped. This rotation is shown in FIGS. 10 and 13.

Rotating the solar panels 28 can also cause the center of mass 46 to move. As shown in FIG. 11 the rotation of the solar panels 28 causes the center of mass 46 to move in a sinusoidal-like manner, where the period of the motion is one day. As shown in FIG. 12, a solar panel 28 which is tipped by 10 inches from a non-angled position, can cause the center of mass 46 to move by approximately 0.28 inches.

Another factor which causes the center of mass 46 to be displaced is the expulsion of fuel from the thrusters 36. When xenon ion propulsion thrusters 36 are used, they generate smaller thrusts than a chemical thruster. Consequently, the burn time for xenon ion propulsion thrusters 36 must be spread out over a longer time frame than a chemical thruster and typically has a duration of 1–2 hours and can range up to six hours per translational maneuver. As shown in FIG. 11, initially the slow thrusts of the xenon ion propulsion thrusters 36 do not cause the center of mass 46 to be displaced significantly. However, after the passing of a week or two, fuel loss starts to provide a significant contribution to displacement of the center of mass 46. Combining the effects of solar panel rotation and fuel depletion causes the center of mass 46 to be displaced as a seasonal variation which is ramped as shown in FIG. 11. Note that the translational maneuver is performed once every 24 hours (see dots at top of envelope of ramped motion).

With the above understanding of the different factors which cause the center of mass 46 to be displaced, it is possible to estimate the true location of the center of mass 46. FIG. 13 shows a typical geometry for the spacecraft 20. There are three parameters of the spacecraft 20 which are known: the thruster platform position, p, relative to the spacecraft reference frame origin 60; the thruster vector position, r, from the thruster platform 38 to the center of the thruster 36 (this represents the point where the thrust is applied); and the thruster platform gimbal angles θ and Φ. In order to accurately align the thruster 36 through the true center of mass 46, the thrust vector, V, the vector position, b, of the ideal center of mass 60 and the center of mass offset w about b need to be estimated.

Figure 14:
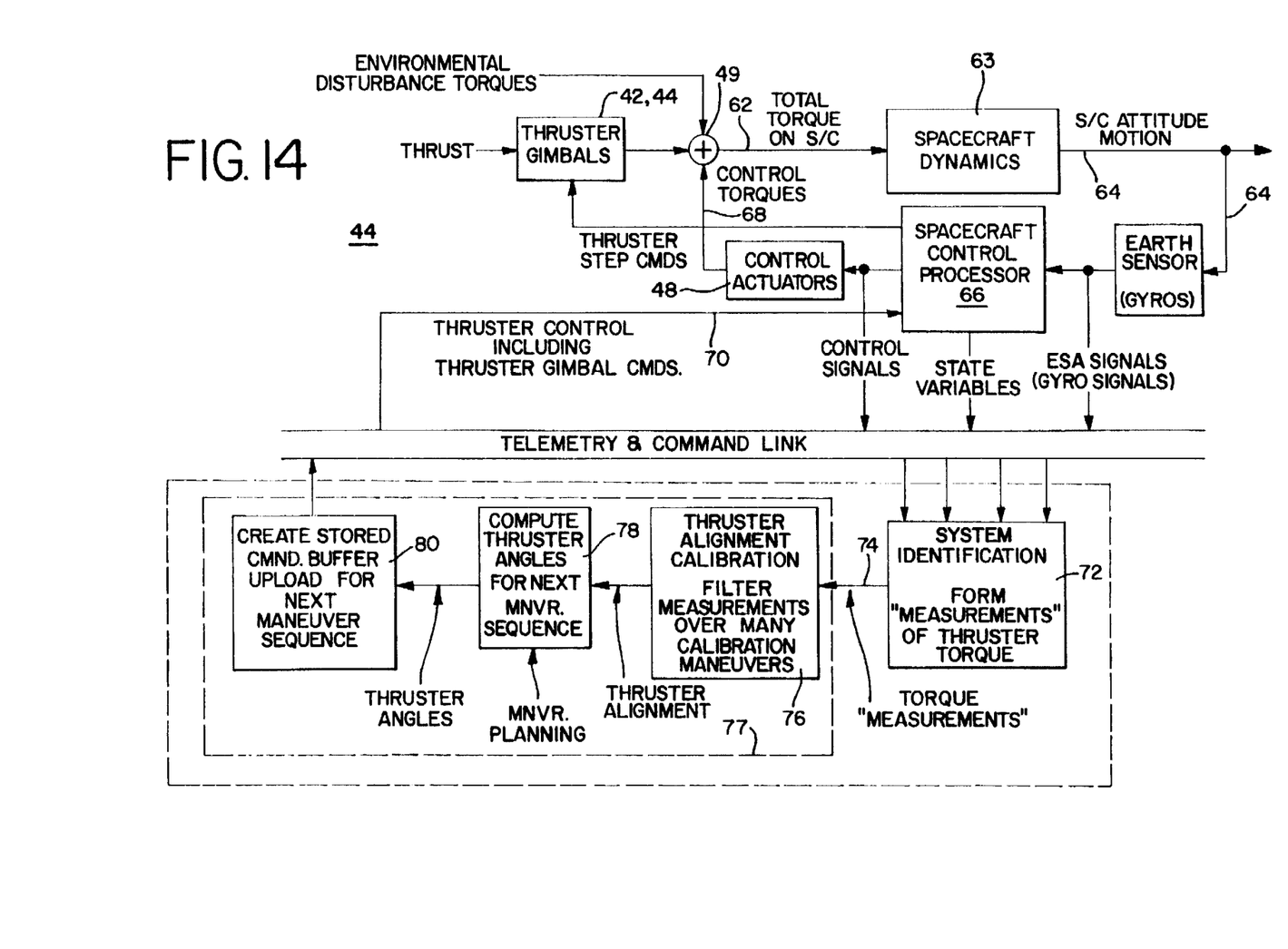
FIG. 14 schematically shows an momentum control system of the present invention.

These unknown parameters V, b and w are estimated by monitoring the total torque encountered by the spacecraft 20 before, during and after the maneuver. As schematically shown in FIG. 14, the momentum wheel 48 stores all the momentum encountered by spacecraft 20 which includes, but is not limited to, the momentum produced at a given time by thrusters 36, solar torques, and by itself. A sensor 49 monitors the momentum wheel 48 and produces a momentum state signal 62 representing the total torque exerted on the spacecraft 20. The momentum state signal 62 is sent to the spacecraft dynamics module 63 which generates from the inertial and geometric properties of the spacecraft 20 stored therein a signal 64 representative of the attitude motion of spacecraft 20.

Signal 64 is then sent to a control processor 66 which also receives the accumulator control signals 68, the thruster control command signals 70 (including the signals controlling the gimbal angles). From the received signals, a control processor 66 is able to send to a system identifier 72, via telemetry and a command link, a state variable signal which represents one or more state variables (like attitude states, wheel speed, gimbal angles, disturbance estimates), derivatives of the state variables, the control signals of the accumulators and the measured position of the spacecraft 20.

Figure 15A:
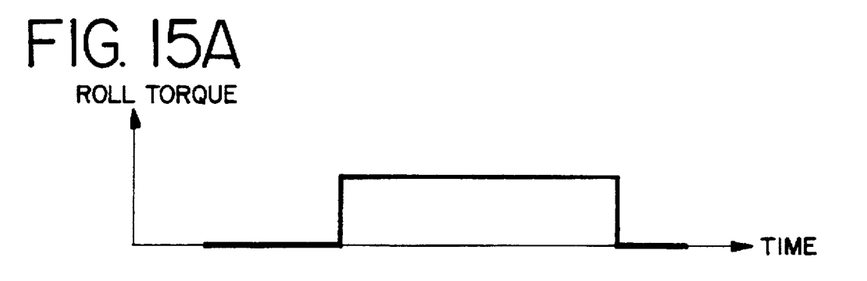
FIGS. 15A–C shows the torque profiles about the roll, pitch and yaw body axes, respectively, from a misaligned thruster with constant mass properties.
Figure 15B:
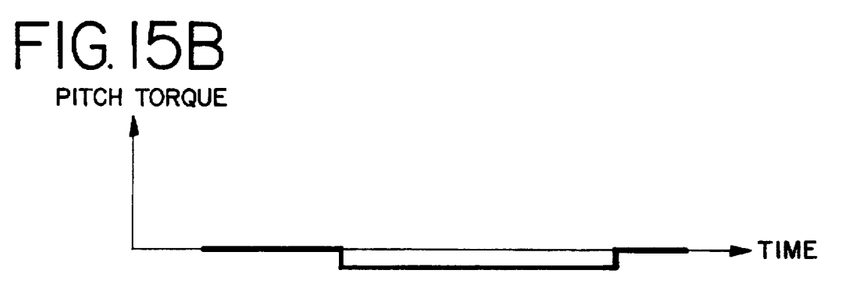
Figure 15C:
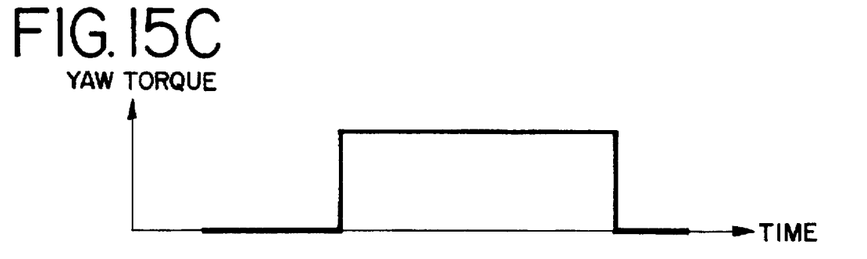
Figure 16:
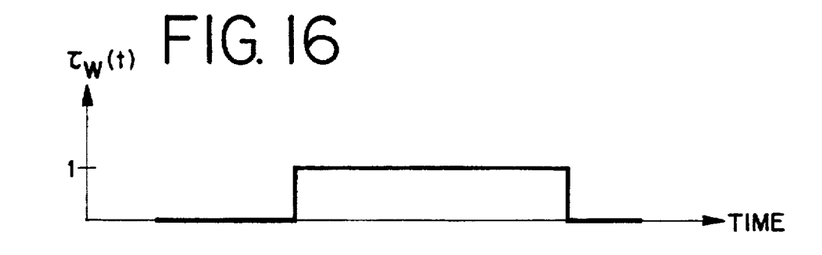
FIG. 16 shows a pseudo input for a spacecraft with constant mass properties.

As explained previously, the position of the center of mass 46 and the magnitude of the solar torques are unknown. However, the character or shape of the time variation in these parameters can be determined so that a pseudo input is formed which is defined as an input signal which within a multiplicative constant has the same characteristics or shape as the actual disturbance would generate if it had been measured. For example, assume that the thruster 36 is misaligned so that a line passing through the thruster force vector, F, misses the center of mass 46 by a vector R as seen in FIGS. 6 and 13. In the absence of time varying mass properties, the thruster 36 would create a constant torque, T=R×F, while the thruster 36 is active, and no torque when the thruster 36 is off, as shown in FIGS. 15A–C. Note that the character or shape of the torque, T, is the same on all three axes. The only difference is in the magnitude of the thrust for each component. Therefore, the pseudo input for each axis is a rectangular unit pulse $\tau_w(t)$ that begins when the thruster 36 is activated, and ends when the thruster 36 is turned off, as shown in FIG. 16.

The above-described procedure for choosing a pseudo input is more involved when time-variations exist in the mass properties of the spacecraft 20. In particular, additional pseudo inputs are needed to represent the time variation in the mass properties. Time variation due to the motion of solar panel 28 is the most significant factor in determining the location of the center of mass 46 of the spacecraft 20. If the solar panels 28 are warped due to solar heating, as the panels 28 rotate to track the sun, the spacecraft's center of mass 46 will orbit the center of mass 66 of the spacecraft 20 with an undeformed wing by an angular velocity ω. Suppose the orbit of the center of mass 46 is in the roll-yaw plane. This is the case when solar panels 18 are mounted along the pitch axis. A thruster 36 is then mounted off of the axis and directed through the undeformed wing center of mass 60 and will create a sinusoidally varying torque on each axis. The sinusoids would oscillate at orbit rate, with phase depending on the geometry of the thruster 36 on the spacecraft body 22. In general, the torque generated by the thruster 36 to compensate for the solar panel 28 motion will have the form:

$T_p = pA \sin(\omega t + \theta) \tau_w(t)$, where, p=a scalar equal to the radius of the spacecraft center of mass with deformed solar panels about the spacecraft center of mass with the solar panels undeformed;

θ=a scalar which is a function of the geometry of the spacecraft;

A=a vector which is a function of the geometry of the spacecraft;

ω=a scalar representing the orbital rate of the spacecraft center of mass about the center of mass with an undeformed wing;

t=time; and $\tau_w(t)$=a step function which is used to window the sinusoid to the time period when the thrusters are active.

Note that $\tau_w(t)$ may be normalized to form pseudo inputs for each axis where p is the unknown parameter to be determined in a well known manner by a system identification processor 72. An example of a program used by the system identification processor 72 is a program present in the so-called MATLAB™ Tool Box set of programs which can solve for the disturbance torques and parameters characterizing the mass property time variation, such as radius w.

The system identification processor 72 isolates disturbance torques from the state variable signal by using a sinusoidal model where the oscillatory frequency and phase depend on the harmonic of the solar torque. The system identification processor 72 then distinguishes disturbance torques from the thruster torques by frequency, phase, and by the window of time when the thruster 36 is active (the disturbance torques exist regardless whether or not thruster 36 is active.) This is why it is necessary to accumulate data both before, during and after the maneuver. Data measured after the maneuver is used in part to determine when the thrusters are turned off. Only one parameter can be identified from each pseudo input. Therefore, three pseudo inputs are required for each of the coordinates of the constant center of mass offset, three are required for the coordinates of the solar panel 28 center of mass motion, and three are required for each solar torque harmonic. It is envisioned that fifteen (three solar torque harmonics) or more pseudo inputs can be used.

Once the pseudo inputs are determined, then a scalar constant needs to be determined for each pseudo input. As mentioned above, the pseudo inputs are, but for a scalar constant, equal to the correct inputs. Accordingly, the values of the scalar constants need to be determined by the system identification processor 72. This is accomplished by modeling the closed loop spacecraft dynamics and control as the system:

$dx(t)/dt = Ax(t) + Bu(t)$, where x (t) are the state variables of the system;

dx(t)/dt are the derivative of the state variables;

A is the matrix relating the state variables to their derivatives;

B is the input matrix that represents the influence of the inputs on changes in each state variables; and u(t) is the vector of inputs.

It is assumed that the input matrix, B, has been written to include a column for each of the pseudo inputs into the system. The output of the system, i.e., the telemetry of the spacecraft, is given by y(t)=Cx(t), where the rows of the matrix C are chosen so that the vector y(t) contains all of the variables computed by telemetry. Finally, let P be a diagonal matrix and let σ(t) be the vector of pseudo inputs, then u(t)=Pσ(t). Thus, given that A, B, C, y(t) are known then P is readily solved using commercially available software.

With the pseudo inputs determined, a thruster torque signal 74 is generated by the system identification processor 72. Thruster torque signal 74 is representative of the torques generated by the thrusters 36. Note, not all of the parameters, such as the solar torques generated by the system identification processor 72, are used in the alignment of the thruster 36. In fact, only the bias offset torques acting on thrusters 36 and the solar panel center of mass radius are required to align the thruster 36. The other parameters, such as solar torques, are identified so that their existence will not bias the estimates of the required parameters. In other words, if the solar torques were not identified, then the values of the bias offset torques and the solar panel center of mass will be adversely affected since they would absorb the contributions from the solar torques.

Next, the parametric data, P, determined by the system identification processor 72 and the statistical data, covariance of P, from the system identification processor 72 is fed to a propulsion processor 77 which includes a thruster alignment calibration processor 76, a thruster angle processor 78 and a buffer 80. Thruster alignment calibration processor 76 uses the parametric and statistical data to find the three unknown quantities V, b, and w as mentioned previously. The thruster alignment calibration processor 76 computes the three unknown quantities using a Kalman filter in a well known manner. The Kalman filter tracks changes in the center of mass, b, motion, thruster force vector, V, and radius w from maneuver to maneuver. The output (V, b, w) of the thrust alignment calibration processor 76 is fed to the thruster angle processor 78 that is used to compute the gimbal angles once the maneuver time and duration have been determined. Maneuver planning is, of course, used to correct the orbit of spacecraft 20. That is, the Kalman filter predicts, for a given maneuver time and duration, the mass properties of spacecraft 20, such as the position of the center of mass (b, w), and thrust force vector, V, based on the parameters from the system identification processor 72. Once V, b, and w are known the thruster 36 can be re-positioned to provide the desired torque. As explained above, the desired torque from the thruster 36 would be chosen to be zero halfway through the maneuver to prevent momentum buildup and control the attitude of the spacecraft 20. Alternatively, the thruster may be positioned to create a net momentum if desired. See J. Meditch "Stochastic Optimal Linear Estimation and Control," McGraw-Hill, 1969 p. 176 for information on the Kalman filtering process.

After computing the gimbal angles in the processor 78, the gimbal angles, maneuver times and durations are stored in a buffer 80. Two weeks worth of gimbal angles and maneuver times and durations are stored in the buffer 80 and sent as control command signals 70 to a control processor 66. After two weeks have passed, the above-described process is repeated to create commands for the gimbal angles and maneuver times and durations for the next two week time period.

In summary, the above-described control system of the present invention improves the ability to determine the mass properties and thruster performances of a spacecraft. The present invention provides for improved alignment of the thrusters of a spacecraft while using data that is already available in the control systems.

The foregoing description is provided to illustrate the invention, and is not to be construed as a limitation. Numerous additions, substitutions and other changes can be made to the invention without departing from its scope as set forth in the appended claims.

We claim:

1. A momentum control system for a spacecraft having a propulsion system in which a disturbance is exerted on the spacecraft, said system comprising:

a control processor for receiving an attitude signal representative of the attitude motion of said spacecraft and processing said attitude signal to generate a state variable signal representative of one or more state variables of said spacecraft;

a system identification processor which receives said state variable signal and isolates a signal which has the characteristics of said disturbance exerted on said spacecraft, said system identification processor generating a pseudo input signal for said isolated disturbance which within a multiplicative constant has substantially the same shape, when plotted as a function of time, as the actual disturbance would have if it had been measured, said system identification processor processing said pseudo input signal to generate a thruster torque signal representative of a thruster torque generated by said propulsion system;

a propulsion processor for receiving said thruster torque signal and generating a control command signal representative of a maneuver to be performed by said propulsion system, said propulsion processor comprising a thruster calibration alignment processor which calculates the mass properties of said spacecraft in response to said thruster torque signals; and wherein said control command signal is sent to said control processor which aligns said propulsion system in response to said control command signal.

2. The momentum control system of claim 1, wherein said propulsion system comprises:

a gimbaled thruster attached to said spacecraft;

an actuator operationally attached to said gimbaled thruster so as to control the angled position of said gimbaled thruster in two orthogonal directions; and wherein said control processor sends a control signal to said actuator which moves said gimbaled thruster to an angled position in response to said control signal, wherein said angled position of said gimbaled thruster controls the attitude of said spacecraft.

3. The momentum control system of claim 2, wherein said gimbaled thruster comprises an ion propulsion thruster.

4. The momentum control system of claim 1, further comprising:

a momentum accumulator for storing and dumping momentum accumulated on said spacecraft;

a sensor for generating a momentum state signal corresponding to the momentum being stored on said spacecraft at a given time, wherein said momentum state signal forms said state variable signal at least in part.

5. The momentum control system of claim 1, wherein said calibration alignment processor calculates the motion of the center of mass of said spacecraft at an instant of time.

6. The momentum control system of claim 5, wherein said calibration alignment processor calculates the thrust vector of said propulsion system.

7. A method of dumping momentum of a spacecraft having a propulsion system in which a disturbance is exerted on the spacecraft, said method comprising the steps of:

receiving an attitude signal representative of the attitude motion of said spacecraft;

generating from said attitude signal a state variable signal representative of several state variables of said spacecraft;

isolating from said state variable signal a disturbance signal which has the characteristics of said disturbance exerted on said spacecraft;

generating a pseudo input signal from said isolated disturbance signal which within a multiplicative constant has substantially the same shape, when plotted as a function of time, as the actual disturbance; and aligning said propulsion system along a thrust vector which is fixed with respect to said spacecraft in response to said pseudo input signal to thereby dump momentum from said spacecraft, such that said thrust vector is momentarily aligned with the center of mass of said spacecraft.

8. The method of claim 7, wherein said moving step comprises moving a gimbaled thruster in response to the value of said pseudo signal.

9. The method of claim 8, wherein the step of generating a pseudo input signal includes the step of:

determining a mass property of said spacecraft.

10. The method of claim 9, wherein said mass property comprises the movement of the center of mass of said spacecraft at an instant of time.

11. A method of simultaneously performing a translational maneuver of a spacecraft by a thruster and dumping momentum from said spacecraft during a time period P, said method comprising the steps of:

aligning said thruster along a thrust vector which is fixed with respect to said spacecraft during said time period P, wherein the thrust vector is momentarily aligned with the center of mass of said spacecraft during said time period P; and firing said thruster throughout said time period P.

12. The method of claim 11, comprising the steps of:

accumulating momentum on said spacecraft from when the thruster is initially fired to a time P/2, at which time said thrust vector is aligned with the center of mass of said spacecraft; and dumping momentum accumulated on said spacecraft from P/2 to the end of time period P.

13. The method of claim 12, wherein the amount of accumulated momentum from when the thruster is initially fired to time P/2 is equal to the amount of momentum dumped on said spacecraft from time P/2 to the end of time period P.

14. The method of claim 11, wherein the position of said center of mass of said spacecraft varies with time.

* * * * *